United States Patent
Washiyama et al.

(10) Patent No.: US 9,138,933 B2
(45) Date of Patent: Sep. 22, 2015

(54) PROCESS AND APPARATUS FOR PRODUCING CRYSTALLINE RESIN FILM OR SHEET

(75) Inventors: Junichiro Washiyama, Kawasaki (JP); Hideharu Kimura, Kawasaki (JP); Koji Yamada, Kawasaki (JP); Takeshi Nakajima, Kawasaki (JP); Akihiro Otsubo, Kawasaki (JP); Masamichi Hikosaka, Higashihiroshima (JP); Kiyoka Okada, Higashihiroshima (JP); Kaori Watanabe, Higashihiroshima (JP)

(73) Assignee: SunAllomer Ltd., Tokyo (JP)

( * ) Notice: Subject to any disclaimer, the term of this patent is extended or adjusted under 35 U.S.C. 154(b) by 841 days.

(21) Appl. No.: 13/146,009

(22) PCT Filed: Jan. 22, 2010

(86) PCT No.: PCT/JP2010/000375
§ 371 (c)(1),
(2), (4) Date: Oct. 4, 2011

(87) PCT Pub. No.: WO2010/084766
PCT Pub. Date: Jul. 29, 2010

(65) Prior Publication Data
US 2012/0018917 A1 Jan. 26, 2012

(30) Foreign Application Priority Data

Jan. 23, 2009 (JP) .................................. 2009-013295

(51) Int. Cl.
*B29C 47/00* (2006.01)
*B29C 47/36* (2006.01)
(Continued)

(52) U.S. Cl.
CPC ............... *B29C 47/364* (2013.01); *B29C 33/58* (2013.01); *B29C 43/222* (2013.01);
(Continued)

(58) Field of Classification Search
CPC ........................................................ B29C 47/906
USPC ............................................... 264/211.12, 280
See application file for complete search history.

(56) References Cited

U.S. PATENT DOCUMENTS 3,328,503 A 6/1967 Ancker
4,555,439 A * 11/1985 Ueeda et al. .................. 428/221
(Continued)

FOREIGN PATENT DOCUMENTS

GB 1478576 A 7/1977
JP 53-086762 7/1978
(Continued)

OTHER PUBLICATIONS

Crawford, R.J.. (1998). Plastics Engineering (3rd Edition). Elsevier. Online version available at: http://app.knovel.com/hotlink/toc/id:kpPEE00002/plastics-engineering/plastics-engineering.*
(Continued)

*Primary Examiner* — Galen Hauth
(74) *Attorney, Agent, or Firm* — Robert E. Krebs; Nixon Peabody LLP

(57) ABSTRACT

A process and apparatus for manufacturing a crystalline resin film or sheet. This manufacturing apparatus includes: an extruder that melts crystalline resin while supplying it; a gear pump that is provided on the downstream side of the extruder; a die which is provided on the downstream side of the gear pump, and which has a slit-shaped aperture; a cooling apparatus which cools film-shaped or sheet-shaped crystalline resin (A) discharged in a melted state from the die to a temperature which is not less than the crystallization temperature but not more than the melting point; and a pair of pinch rolls that press-roll between them the film-shaped or sheet-shaped crystalline resin (B) which has passed through the cooling apparatus (40), wherein the pair of guide rolls are positioned such that the thickness of the film-shaped or sheet-shaped crystalline resin (B) which has passed through the cooling apparatus is between 1.3 and 8.0 times the thickness of the film or sheet (C, D) after it has been press-rolled.

5 Claims, 2 Drawing Sheets

(51) Int. Cl.

| | | |
|---|---|---|
| *B29C 33/58* | (2006.01) | |
| *B29C 43/22* | (2006.01) | |
| *B29C 47/32* | (2006.01) | |
| *B29C 47/92* | (2006.01) | |
| *C08J 5/18* | (2006.01) | |
| *B29C 47/38* | (2006.01) | |
| *B29C 47/34* | (2006.01) | |
| *B29C 47/88* | (2006.01) | |
| *B29K 23/00* | (2006.01) | |
| *B29K 25/00* | (2006.01) | |
| *B29K 27/06* | (2006.01) | |
| *B29L 7/00* | (2006.01) | |

(52) U.S. Cl.
CPC .......... *B29C 47/004* (2013.01); *B29C 47/0021* (2013.01); *B29C 47/32* (2013.01); *B29C 47/38* (2013.01); *B29C 47/8845* (2013.01); *B29C 47/92* (2013.01); *C08J 5/18* (2013.01); *B29C 47/0057* (2013.01); *B29C 47/34* (2013.01); *B29C 47/367* (2013.01); *B29C 47/884* (2013.01); *B29C 2947/926* (2013.01); *B29C 2947/92019* (2013.01); *B29C 2947/9238* (2013.01); *B29C 2947/9258* (2013.01); *B29C 2947/9259* (2013.01); *B29C 2947/92095* (2013.01); *B29C 2947/92152* (2013.01); *B29C 2947/92209* (2013.01); *B29C 2947/92647* (2013.01); *B29C 2947/92704* (2013.01); *B29C 2947/92885* (2013.01); *B29C 2947/92923* (2013.01); *B29K 2023/00* (2013.01); *B29K 2023/04* (2013.01); *B29K 2023/10* (2013.01); *B29K 2025/04* (2013.01); *B29K 2027/06* (2013.01); *B29K 2995/0041* (2013.01); *B29L 2007/008* (2013.01); *C08J 2323/12* (2013.01)

(56) References Cited

U.S. PATENT DOCUMENTS

| 5,674,442 | A * | 10/1997 | Morita ................. 264/178 R |
|---|---|---|---|
| 2002/0192891 | A1 | 12/2002 | Takata et al. |
| 2004/0099986 | A1* | 5/2004 | Kannankeril et al. ... 264/173.14 |
| 2007/0210480 | A1 | 9/2007 | Funaki et al. |

FOREIGN PATENT DOCUMENTS

| JP | 55-027203 | 2/1980 |
|---|---|---|
| JP | 56-033924 | 4/1981 |
| JP | 58-185224 | 10/1983 |
| JP | 60-089333 | 5/1985 |
| JP | 60-097835 | 5/1985 |
| JP | 60-097836 | 5/1985 |
| JP | 63-045029 | 2/1988 |
| JP | 05-092470 | 4/1993 |
| JP | 05-104620 | 4/1993 |
| JP | 7-164461 A | 6/1995 |
| JP | 2000-246785 A | 9/2000 |
| JP | 2002-264161 A | 9/2002 |
| JP | 4041865 | 2/2008 |
| JP | 2008-248039 | 10/2008 |
| WO | 2007-026832 A1 | 3/2007 |
| WO | 2008/108251 A1 | 9/2008 |
| WO | 2009/008340 A1 | 1/2009 |

OTHER PUBLICATIONS

Extended European Search Report in European Patent Application No. 10733373.4, dated May 8, 2012.
Chinese Office Action in Chinese Application No. 201080005315.5, mailed on May 6, 2013.
Mandelkem, Leo, "Polymer Crystallization", translated by Akio Nakajima et al., Kagekudolijin, pp. 191-193 (1966).
Moore, Edward P., Jr., "Polypropylene Handbook", translated by Tetsuo Yasuda et al., Kogyo Chosakai Publishing Co. Ltd., pp. 222-223 (1998).
Wikjord, A.G, et al., "The Morphology of Fibrillar Polyethylene Crystals", J. Macromol. Sci.-Phys., B2(3), pp. 501-537 (Sep. 1968).
Wunderlich, Bernhard et al., "Polyethylene Crystallized from the Melt Under Elevated Pressure", Journal of Polymer Science, vol. 2, pp. 3697-3706 (1964).
Fujiyama, Mitsuyoshi, "Structure of Skin Layer on Polypropylene Extrusion-Molded Objects", Japanese Journal of Polymer Science and Technology, vol. 32, No. 7, pp. 411-417 (Jul. 1975).
Yamazaki, Shinichi et al., "Formation mechanism of shish in the oriented melt (I)-bundle nucleus becomes to shish", Polymer, 46, pp. 1675-1684 (2005).
Yamazaki, Shinichi et al., "Formation mechanism of shish in the oriented melt (II)-two different growth mechanisms along and perpendicular to the flow direction", Polymer, 46, pp. 1685-1692 (2005).
Hikosaka, Masamichi, "Unified theory of nucleation of folded-chain crystals and extended-chain crystals of linear-chain polymers", Polymer, vol. 28, pp. 1257-1264 (Jul. 1987).
Watanabe, Kaori et al., "Acceleration Mechanism of Growth Rates Under Shear Flow Due to the Oriented Melt—The Novel Morphology of Spiral Crystal (Spiralite)", Macromolecules, vol. 39, No. 4, pp. 1515-1524.
Hillig, W.B., Acta Metallurgica, vol. 14, pp. 1868-1869 (1966).
International Search Report, PCT/JP2010/000375, dated Apr. 13, 2010.
International Preliminary Report on Patentability in International Application No. PCT/JP2010/000375, mailed Aug. 4, 2011.

* cited by examiner

PROCESS AND APPARATUS FOR PRODUCING CRYSTALLINE RESIN FILM OR SHEET

CROSS REFERENCE TO RELATED APPLICATIONS OR PRIORITY CLAIM

This application is a national phase of International Application No. PCT/JP2010/000375, entitled "PROCESS AND APPARATUS FOR PRODUCING CRYSTALLINE RESIN FILM OR SHEET", which was filed on Jan. 22, 2010, and which claims priority of Japanese Patent Application No. 2009-013295, filed Jan. 23, 2009, the contents of which are incorporated herein by reference.

DESCRIPTION

1. Technical Field

The present invention relates to a process and apparatus for producing a crystalline resin film or sheet having superior properties such as mechanical properties, heat-resistance, and transparency and the like.

2. Technical Background

Polyethylene (referred to hereinafter as PE), polypropylene (referred to hereinafter as PP), polystyrene (referred to hereinafter as PS), polyvinyl chloride (referred to hereinafter as PVC) and the like are known as 'general-purpose plastics'. These general-purpose plastics are easily molded, and their weight is only a fraction of that of metal or ceramics. Furthermore, they are extremely low in cost. Consequently, they are widely used as the constituent materials for a variety of household articles such as bags and various types of packaging, containers, and sheet materials and the like, and also as the constituent materials for components for the automotive and electrical industries, and for commodities for daily use, and miscellaneous articles.

However, these general-purpose plastics do not have sufficient mechanical strength, and have low heat resistance. Namely, these general-purpose plastics do not have enough of the necessary properties that are demanded in materials used for mechanical products for automobiles and the like, and for various industrial products such as electrical, electronic, and information products. Because of this, currently, their applicable range is limited. For example, PE normally has a softening temperature of approximately 90° C. Even PP, which is regarded as having comparatively high heat resistance, normally softens at 130° C. or less. In addition, compared to polycarbonate (referred to hereinafter as PC), polyethylene terephthalate (referred to hereinafter as PET), and PS, the transparency of PP is not satisfactory. As a consequence, PP cannot be used for optical materials or bottles or transparent containers.

In contrast, PET, PC, fluorine resins (such as Teflon (registered trademark), nylon, polymethylpentene, polyoxymethylene, acrylic resins and the like are known as 'engineering plastics'. These engineering plastics have superior mechanical properties, heat resistance, and transparency, and normally do not soften at 150° C. Accordingly, engineering plastics are used as the materials for optics and for various industrial products in which a high performance is demanded such as automotive and mechanical products and electrical products and the like.

However, these engineering plastics have the following major drawbacks. These engineering plastics have a comparatively large relative density and are expensive. In life-cycle assessment, the quantity of carbon dioxide discharged is also high, and monomer recycling is either difficult or impossible so that they impose a severe burden on the environment.

Accordingly, by greatly improving the material properties of general-purpose plastics such as their mechanical properties, heat resistance, and transparency, these general-purpose plastics can be used as a substitute material for engineering plastics, and even as a substitute material for metals. As a result of this, it becomes possible to considerably reduce the costs of various polymer and metal industrial products and household articles. Furthermore, it is also possible to lighten the weight of such industrial products and household articles and, not only is it possible to considerably reduce energy consumption, but to also improve the operability thereof. For example, PET is currently used for bottles for beverages such as refrigerated drinking water and the like. If it were to become possible to substitute this PET for PP, then it would be possible to considerably reduce the cost of the bottles. Moreover, although it is not an easy process, PET is capable of undergoing monomer recycling. Therefore, after used PET bottles have been cut up, they can be reused once or twice more for low-quality applications such as for clothing fiber or film or the like before being discarded. In contrast, because monomer recycling is simple with PP, complete recycling can be achieved. Namely, the consumption of fossil fuels such as oil as well as the generation of carbon dioxide ($CO_2$) can be suppressed.

As is described above, in order for general-purpose plastics to be used as substitute materials for engineering plastics and metals, it is necessary for properties such as the mechanical properties, heat resistance, and transparency of general-purposed plastics to be improved. Specifically, ways of markedly increasing the proportion of crystals (i.e., the crystallinity) in PP and PE, and more preferably, of manufacturing crystals which are made up solely of crystal and contain almost no amorphous PP and PE are sought.

A method of reducing the speed of cooling a polymer melt (see Non-patent document 1) is known as a method of improving polymer crystallinity. However, this method has its drawbacks. For example, because the increase in the degree of crystallinity is totally insufficient, there is a remarkable drop in the productivity of manufactured items, and the crystal grain diameter is coarser so that there is a deterioration in the mechanical properties. In addition to this method, a 'method of increasing the degree of crystallinity by cooling a polymer melt under high pressure' has been proposed as another method (see Non-patent document 1). However, in this method, it is necessary to pressurize the polymer melt to several hundred atmospheres or more, and designing manufacturing equipment is difficult for production on an industrial scale so that production costs are too high. Accordingly, although it is theoretically possible to employ this method, employing this method in reality is difficult. Another method known to improve the crystallinity of a polymer is a 'method of adding a nucleating agent to a polymeric melt' (see Non-patent document 2). However, currently, this method has the drawbacks that (a) the admixture of a nucleating agent which is an impurity is unavoidable, and (b) the increase in the degree of crystallinity is insufficient, and the cost of the nucleating agent is far higher than that of resin so that increases in cost occur. Because of this, there has not as yet been developed a method of dramatically improving the degree of crystallinity in polymers such as general-purposed plastics, or a method of producing a polymer crystal.

As a result of the considerable research already carried out, it has become evident that, by crystallizing a polymer melt (known as an isotropic melt) in which the molecular chains in the melt exist in a state of disarray (for example, in a random coil) in a shear flow field, a characteristic crystal form (shish) in which slender, fibrous crystals having a thickness of several um are aligned in the flow direction, and a mode (kebab) in which thin plate-shaped crystals having a thickness of several nm which are skewered by the shish are stacked in a sandwich shape together with non-crystals are created scatteringly throughout the melt (see Non-patent document 3). The state thus described is referred to as a 'shish-kebab' (it means a spit and a meat of a spit-roasting).

When a shish-kebab is initially formed, only the shish is formed scatteringly. The structure of a shish is an extended chain crystal (ECC) in which the molecular chain is extended and crystallized (see Non-patent document 4). The structure of a crystal portion of a kebab can be considered to be a folded chain crystal (FCC) in which the molecular chain is folded at the surface of the thin plate-shaped crystal. The molecular level formation mechanism of a shish-kebab has no research examples that are based on kinetic studies, and is not yet clear. Folded chain crystals are thin plate-shaped crystals (known as lamellar crystals) that are most widely seen in polymeric crystals. Moreover, when extrusion-molded into a die, a thin crystalline layer having a thickness of several hundred urn and known as 'skin' is formed on the surface of the crystals. In addition, an aggregate of the folded chain crystals and non-crystals (a stacked structure known as a stacked lamellar structure) which is known as a 'core' is formed in the interior thereof (see Non-patent document 5). It is thought that the skin is formed from the shish-kebab, however, it has been confirmed that the shish is only present in a sparsely scattered manner.

The inventors of the present invention were the first to perform kinetic research on the shish formation mechanism. As a result, they revealed a mechanism in which molecular chains in portions of the melt become extended at foreign matter interfaces due to 'topological interaction' with these interfaces, and consequently form melts which, at the liquid crystal level, are in a mutually oriented state relative to each other (i.e., become what is known as 'oriented melt'), so as to create a shish in a portion of the melt (see, for example, Non-patent documents 6 and 7). This 'topological interaction' refers to "an effect whereby, because string-shaped molecular chains that are characterized by one-dimensional topology (mathematical topology) are mutually entangled each other, in flow field the molecular chains pull against each other and slide against each other". This topological interaction is known as being an interaction which is unique to polymers. The inventors of the present invention were the first to suggest a polymer topological crystallization mechanism theory, and determined the origin of extended chain crystals and folded chain crystals. This theory is known as 'sliding diffusion theory', and is recognized worldwide (see Non-patent document 8).

The inventors of the present invention determined a mechanism to create spiral crystals (spiralite) in shear flow crystallization having a low shear strain rate of 0.01 to 0.1 $s^{-1}$ in the Furthermore, the inventors of the present invention were the first to experimentally verify from this formation mechanism that, in shear crystallization, molecular chains are extended at foreign matter interfaces so that oriented melt is generated. As a result of this, they suggested a universal mechanism in which nucleation and growth rates are markedly accelerated (see Non-patent document 9).

Accordingly, if it is possible to change an entire polymer melt into an oriented melt, then crystallization of the polymer is able to occur extremely easily, and the degree of crystallinity is raised. Here, when the entire polymer melt is an oriented melt, then this is known as a 'bulk oriented melt'. Furthermore, if it is possible to crystallize an entire polymer melt while it is in an oriented melt state, then it is anticipated that it may be possible to produce crystals having a structure in which the molecular chains of a majority of the polymers are oriented (these are known as bulk "polymer oriented crystals"). In this case, nucleation accelerates even more markedly, and because there is an abrupt change to 'homogeneous nucleation' in which countless cases of nucleation occur between molecular chains without the addition of a nucleating agent, it is possible to avoid the admixture of impurities, and to also obtain crystals whose size is in the order of nanometers. Namely, it is anticipated that it will be possible to obtain polymers having a high degree of transparency, and in which the mechanical properties and heat resistance rapidly increase. This 'homogeneous nucleation' refers to cases when, in well-known classical nucleation theory, no assistance is sought from foreign matter such as nucleating agents and the like, and nucleation occurs spontaneously (see Non-patent document 10). In contrast to this, cases in which assistance is sought from foreign matter such as nucleating agents and the like and nucleation occurs on the foreign matter surface are known as 'heterogeneous nucleation'. Conventionally, in all substances, crystallization from bulk melt has been 'heterogeneous nucleation.

In Patent document 1, there is described 'a method in which rod-shaped polypropylene which is at crystallization temperature is extruded at high speed so as to form a crystal'. However, in the method described in Patent document 1, unevenness is generated in the distortion speed within the rods so that there is a low degree of homogeneity. Furthermore, it is difficult to manufacture polymer crystals both continuously and in large quantities, and this method is not applied to industry.

In Patent document 2, a polymer crystal having a high degree of crystallinity is described. However, the polymer crystal described in Patent document 2 contains nucleating agents. As a consequence, there is a reduced difference between the melt and the crystallization temperature, so that molding conditions are more restrictive.

In Patent document 3, there is described 'a method in which ultra high molecular weight polypropylene powder is transported while being continuously squeezed by rolls so as to form a sheet'. However, in the method described in Patent document 3, processing is performed at a temperature that is above the temperature of the DSC curve peak which shows the melt and is obtained during heating, but is below the crystalline melting point, and because there is no further heating above the crystalline melting point, crystals that are not completely melted still exist (here, crystalline melting point refers to the temperature at the bottom of the peak high temperature side on the DSC curve where the crystal is completely melted, namely, the melt end temperature). Because of this, a limit is imposed on the processing speed so that productivity is reduced. Moreover, it is not possible to create the above described 'bulk oriented melt', and heterogeneous nucleation is generated. As a result, it is difficult to achieve sufficient transparency and rigidity.

In Patent document 4, there is described 'a method in which polypropylene having a smectic structure is first formed, and then press-rolled so as to manufacture a transparent sheet'. Namely, in the method described in Patent document 4, there are provided at least two steps, i.e., a step to obtain a sheet having a smectic structure, and a press-rolling step. However, in the step to obtain the sheet having a smectic structure, not only is a polypropylene-ethylene copolymer used, but also a petroleum resin is added, and rapid cooling is required. It is difficult to achieve a high level of rigidity in a sheet which is ultimately obtained via steps such as these.

In Patent document 5, there is described a method in which a polypropylene extruded sheet is sandwiched between a pair of rolls and press-rolled. However, when the polypropylene extruded sheet is being obtained and when it is being press-rolled, it is difficult to generate homogeneous nucleation from the bulk oriented melt. Accordingly, it is difficult to obtain high levels of transparency and rigidity.

PATENT DOCUMENTS

[Patent document 1] International Patent Publication No. WO 2008/108251
[Patent document 2] Japanese Patent Application, First Publication No. 2008-248039
[Patent document 3] Japanese Patent Application, First Publication No. H5-104620
[Patent document 4] Japanese Patent Application, First Publication No. S55-27203
[Patent document 5] Japanese Patent Application, First Publication No. S56-33924

NON-PATENT DOCUMENTS

[Non-patent document 1] "Polymer Crystallization", Leo Mandelkern, translated by Akio Nakajima, Kagakudoujin, 1966 pp. 191-193
[Non-patent document 2] "Polypropylene Handbook", Edward P. Moore Jr., translated by Tetsuo Yasuda, Kogyo Chosakai Publishing Co., Ltd., pp. 222-223
[Non-patent document 3] A. G. Wikjord and R. ST. John Manley, J. Macromol. Sci, Phys., B2, 501 (1968)
[Non-patent document 4] B. Wunderlich, T. Arakawa, J. Polym. Sci., 2, 3697-3706 (1964)
[Non-patent document 5] "Structure of Skin Layer on Polypropylene Injection-Molded Objects", Mitsuyoshi Fujiyama, Japanese Journal of Polymer Science and Technology, 32 (7), pp. 411 417 (1975)
[Non-patent document 6] S. Yamazaki, M. Hikosaka et al, Polymer, 46, 2005, 1675-1684.
[Non-patent document 7] S. Yamazaki, M. Hikosaka et al, Polymer, 46, 2005, 1685-1692.
[Non-patent document 8] M. Hikosaka, Polymer 1987 28 1257-1264
[Non-patent document 9] K. Watanabe et al, Macromolecules 39(4), 2006, 1515-1524.
[Non-patent document 10] W. B. Hillig, Acta Metallurgica, 14, 1966, 1868-1869

DISCLOSURE OF THE INVENTION

Problems to be Solved by the Invention

At present, in polymers such as general-purpose plastics and the like, a method of manufacturing crystals having a rapidly improved degree of crystallinity both continuously and in large quantities has not yet to be established.

The present invention was conceived in view of the above described circumstances, and it is an object thereof to provide a process and apparatus for manufacturing both continuously and in large quantities a crystalline resin film or sheet having superior properties such as mechanical properties, heat resistance, and transparency.

Means for Solving the Problem

As a result of investigating methods of orienting molecular chains of crystalline resins both in large quantities and with superior orientation, the inventors of the present invention discovered that when a crystalline resin melted material was press-rolled and pulled using pickup rolls at a specific temperature so as to become deformed at a high strain rate, then the molecular chains were oriented in the same direction with superior orientation, and the crystallinity was increased. In addition, they investigated conditions in which the strain rate was increased, and were able to invent the process and apparatus for manufacturing the following crystalline resin film or sheet.

In order to solve the above described problems, this invention provides the following means.

[1] A process for manufacturing a crystalline resin film or sheet of the present invention is a process for manufacturing a crystalline resin film or sheet in which film-shaped or sheet-shaped crystalline resin which is in a melted state is press-rolled between a pair of pinch rolls, wherein the thickness of the film-shaped or sheet-shaped crystalline resin that is supplied to the pinch rolls is between 1.3 and 8.0 times the thickness of the film or sheet after it has been press-rolled, and the temperature of the sheet-shaped crystalline resin during the press-rolling is not less than the crystallization temperature and not more than the melting point, and the roll speed is adjusted such that the Z which is expressed in the following Formula (1) is 0.09 or less.

$$Z=[(\text{radius [mm] of pinch rolls} \times \text{thickness [mm] of film or sheet after press-rolling})^{1/2}]/\text{roll speed [m/min]} \quad \text{Formula (1)}$$

Here, the roll speed refers to the speed of movement of the surface of the rolls which is created by rotation.

[2] In the process for manufacturing a crystalline resin film or sheet of the present invention, it is preferable for the crystalline resin film or sheet to be obtained by discharging melted crystalline resin from a die which has a slit-shaped aperture portion.

[3] In the process for manufacturing a crystalline resin film or sheet of the present invention, after being press-rolled, it is preferable for the film-shaped or sheet-shaped crystalline resin to be peeled away from the pinch rolls, and for gas to be blown onto the press-rolled portions of the film-shaped or sheet-shaped crystalline resin that have been peeled away from the pinch rolls.

[4] In the process for manufacturing a crystalline resin film or sheet of the present invention, it is preferable for mold release treatment to be performed in advance on the circumferential surface of each pinch roll.

[5] In the process for manufacturing a crystalline resin film or sheet of the present invention, when T is the temperature of the film-shaped or sheet-shaped crystalline resin during press-rolling, and where $T_c$ is the crystallization temperature, and when Tm is the melting point, then it is preferable for the temperature T of the crystalline resin to be adjusted such that the value of X which is determined by the following Formula (2) is within a range of 0.05 to 0.90.

$$X=(Tm-T)/(Tm-Tc). \quad \text{Formula (2)}$$

[6] In an apparatus for manufacturing a crystalline resin film or sheet of the present invention, there are provided: an extruder that melts crystalline resin while supplying it; a gear pump that is provided on the downstream side of the extruder; a die which is provided on the downstream side of the gear pump, and which has a slit-shaped aperture; a cooling apparatus which cools film-shaped or sheet-shaped crystalline resin discharged in a melted state from the die to a temperature which is not less than the crystallization temperature but not more than the melting point; and a pair of pinch rolls that press-roll between them the film-shaped or sheet-shaped crystalline resin which has passed through the cooling apparatus, wherein the pair of guide rolls are positioned such that the thickness of the film-shaped or sheet-shaped crystalline resin which has passed through the cooling apparatus is between 1.3 and 8.0 times the thickness of the film or sheet after it has been rolled.

[7] In the apparatus for manufacturing a crystalline resin film or sheet of the present invention, it is preferable for Z which is expressed by the following Formula (1) to be 0.09 or less.

$$Z = [(\text{radius [mm] of pinch rolls} \times \text{thickness [mm] of film or sheet after press-rolling})^{1/2}]/\text{roll speed [m/min]} \quad \text{Formula (1)}$$

[8] In the apparatus for manufacturing a crystalline resin film or sheet of the present invention, it is preferable for a wind-on device onto which the press-rolled film or sheet is wound to be provided on the downstream side of the pair of pinch rolls.

[9] In the apparatus for manufacturing a crystalline resin film or sheet of the present invention, it is preferable for there to be provided a twist prevention device that blows gas onto the press-rolled portions of the film-shaped or sheet-shaped crystalline resin that have peeled away from the pinch rolls.

[10] In the apparatus for manufacturing a crystalline resin film or sheet of the present invention, it is preferable for mold release treatment to be been performed on the circumferential surface of each pinch roll.

Effects of the Invention

According to the process and apparatus for manufacturing a crystalline resin film or sheet of the present invention, it is possible to orient molecular chains of crystalline resins both in large quantities and with continuously superior orientation. Namely, it is possible to manufacture on an industrial scale a crystalline resin film or sheet having superior mechanical properties, heat resistance, and transparency.

Figure 1:
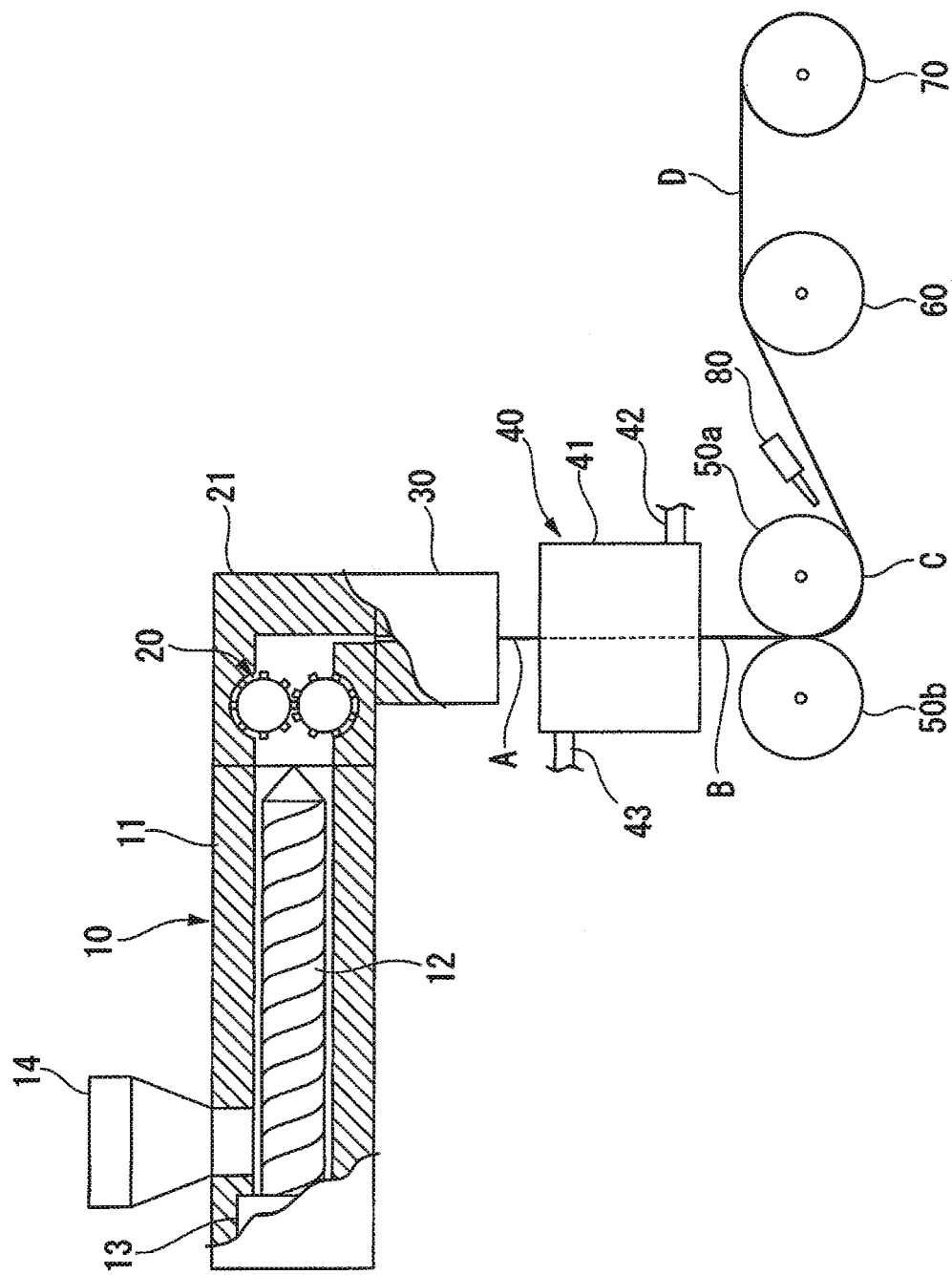
FIG. 1 is a typical view showing an example of an embodiment of an apparatus for manufacturing a crystalline resin film or sheet of the present invention.

BEST EMBODIMENTS FOR IMPLEMENTING THE INVENTION (Apparatus for Manufacturing a Crystalline Resin Sheet)

An embodiment of an apparatus for manufacturing a crystalline resin sheet of the present invention (hereinafter, referred to as a manufacturing apparatus) will now be described.

A manufacturing apparatus 1 of the present embodiment is a manufacturing apparatus that is used to press-roll sheet-shaped crystalline resin which is in a melted state so as to obtain a crystalline resin sheet. This manufacturing apparatus 1 is equipped with an extruder 10, a gear pump 20 which is provided on the downstream side of the extruder 10, a slit die 30 which is provided on the downstream side of the gear pump 20, a cooling apparatus 40 which cools sheet-shaped crystalline resin A discharged from the slit die 30, a pair of pinch rolls 50A and 50B that press-roll between them a crystalline resin sheet B which has passed through the cooling apparatus 40, a guide roll 60 that bends the direction of transport of a sheet-shaped crystalline resin C which has been transported from the pinch rolls 50a and 50b, a wind-on roll 70 onto which is wound a sheet-shaped crystalline resin D which has been transported from the guide roll 60, and a twist prevention device 80 which is located between a circumferential surface of the pinch roll 50a and the sheet-shaped crystalline resin C after it has been press-rolled.

The extruder 10 has a structure that enables it to melt crystalline resin as it supplies it. This extruder 10 is equipped with a cylinder 11 which is capable of applying heat and is horizontally aligned, a screw 12 which is provided inside the cylinder 11, a motor 13 that drives the screw 12, and a hopper 14 that is used to supply crystalline resin to the upstream side of the cylinder 11.

The cylinder 11 can also be divided into a plurality of blocks. By dividing the cylinder 11 into a plurality of blocks, temperature adjustment can be performed in each one of the blocks.

The screw 12 may be formed by only one screw or by two screws. If the screw 12 is formed by a single screw (i.e., in the case of a single screw extruder), then, for example, a fully-flighted type or a Dulmage type of screw can be used for the screw 12.

The gear pump 20 has a structure that enables it to supply a constant quantity of crystalline resin which is in a melted state to the slit die 30. The gear pump 20 of the present embodiment is housed within a housing 21 which is capable of applying heat.

The gear pump 20 may be an external contact type or an internal contact type of gear pump. In the case of an external type of gear pump, the number of gears may be either two or three or more.

The slit die 30 has a slit-shaped broad aperture portion. For example, a die known as a T-die is used. In the slit die 30 of the present embodiment, the aperture portion is positioned facing downwards. The lip opening angle of this aperture portion is, for example, 0.3 to 3.0 mm.

The cooling apparatus 40 has a structure that enables it to cool the sheet-shaped crystalline resin B which is in a melted state to a temperature above the crystallization temperature but below the melting point temperature.

In order to cool the sheet-shaped crystalline resin B which is in a melted state to a temperature above the crystallization temperature but below the melting point temperature, the cooling apparatus 40 needs to provide a superior cooling performance. This cooling apparatus 40 is equipped with a chamber 41 which has an entrance and an exit for the sheet-shaped crystalline resin B, a cooling gas supply pipe 42 which is used to supply cooling gas to the chamber 41, and a discharge pipe 43 which is used to expel gas inside the chamber 41.

The temperature of the cooling gas is preferably not more than 0° C., and more preferably not more than −50° C.

If the chamber 41 has a rectangular parallelepiped box shape, then the flow rate of the cooling gas is preferably not less than 7/Lc (wherein Lc is the length [m] of the chamber 41 in the flow direction of the crystalline resin B) [m/sec] and more preferably not less than 10/Lc [m/sec]. If the cooling gas flow rate is $7/L_c$ [m/sec] or more, a sufficient cooling performance can be obtained. It is also preferable for the cooling gas flow rate to be not more than $20/L_c$ [m/sec]. If the cooling gas flow rate is $7/L_c$ [m/sec] or less, the crystalline resin B can be transported stably through the chamber 41.

Examples of the cooling gas include nitrogen gas created by vaporizing liquid nitrogen, and air which includes nitrogen gas created by vaporizing liquid nitrogen.

The quantity of cooling gas which is supplied is adjusted such that the temperature of the sheet-shaped crystalline resin B is not less than the crystallization temperature and not more than the melting point.

The pinch rolls 50a and 50b are positioned such that the thickness of the sheet-shaped crystalline resin B which has passed through the cooling apparatus 40 is between 1.3 and 8.0 times the gap between the two pinch rolls 50a and 50b.

The material used to form the pinch rolls 50a and 50b is not particularly limited. However, metal is preferable as it is able to reliably press-roll the sheet-shaped crystalline resin B which is in a melted state.

The circumferential surfaces of the pinch rolls 50a and 50b have preferably undergone mold release treatment in advance. By doing this, even when the pinch rollers 50a and 50b have been rotated at high speed, the sheet-shaped crystalline resin C can be easily peeled off the pinch rollers 50 and 50b after being press-rolled.

To perform this mold release treatment a method may be employed in which, for example, a mold release agent such as silicone or fluorine resin is coated or sprayed onto the circumferential surfaces of the pinch rollers 50a and 50b.

The pinch rollers 50a and 50b are fixed, for example via the use of air cylinders or the like. The pressure of the air cylinders is preferably set to a high pressure so that there is minimal variation in the gap between the pinch rolls 50a and 50b even when the sheet-shaped crystalline resin is being supplied at high speed.

The twist prevention device 80 has a structure that enables it to blow jets of gas towards portions of the sheet-shaped crystalline resin C after it has been press-rolled which have separated from the pinch roll 50a. In the present invention, as is described below, because the pinch rolls 50a and 50b are rotated at high speed, the sheet-shaped crystalline resin C is easily twisted around the pinch roll 50a. However, in the present embodiment, because the peeling of the sheet-shaped crystalline resin C away from the pinch roll 50a is assisted by the gas blown from the twist prevention device 80, any twisting of the sheet-shaped crystalline resin C can be prevented.

In the manufacturing apparatus 1, the pressure of the crystalline resin which is in a melted state is measured from the gear pump 20 to the slit die 30 by a pressure meter, and it is preferable for the rotation speed of the motor 13 of the extruder 10 to be controlled such that the measured pressure is kept constant at a predetermined pressure.

It is preferable for the rotation speed of the pinch rolls 50a and 50b to be controlled in accordance with the rotation speed of the gear pump 20.

By performing such controls for the extruder 10 and the pinch rolls 50a and 50b, it is possible to stably and continuously manufacture a crystalline resin sheet.

In the manufacturing apparatus 1, by supplying crystalline resin which is in a melted state at a constant rate via the gear pump 20 so as to form the sheet-shaped crystalline resin A which is in a melted state, and by then cooling this sheet-shaped crystalline resin A, the temperature of the sheet-shaped crystalline resin B that is supplied to the pinch rolls 50a and 50b can be kept above the crystallization temperature and below the melting point. In addition, by press-rolling and pulling the sheet-shaped crystalline resin which has been adjusted to the above described temperature between the pair of pinch rolls 50a and 50b, it is possible to impart considerable strain to the molecular chain of the crystalline resin. As a consequence, because the molecular chain can be oriented with a high degree of orientation, the degree of crystallization in the obtained resin sheet is also high. Because the obtained crystalline resin sheet has a high degree of crystallization, it has superior mechanical properties, heat resistance, and transparency.

Process for Manufacturing a Crystalline Resin Sheet

A process for manufacturing a crystalline resin sheet using the above described manufacturing apparatus 1 will now be described. In the manufacturing process of the present embodiment, the following steps are performed in the following sequence.

Step 1:

The cylinder 11 is heated and the motor 13 is then driven so that the screw 12 is rotated, and pellets of crystalline resin are supplied from the hopper 14. As a result of this, while the crystalline resin supplied to the interior of the cylinder 11 is being melted, it is supplied to the gear pump 20 by the screw 12.

Step 2:

The melted crystalline resin passes through the gear pump 20 resulting in a constant quantity of the crystalline resin being supplied.

Step 3:

The crystalline resin is discharged from the slit die 30 so as to form the sheet-shaped crystalline resin A which is in a melted state.

Step 4:

The sheet-shaped crystalline resin A which is in a melted state is cooled by cooling gas inside the chamber 41 of the cooling apparatus 40.

Figure 2:
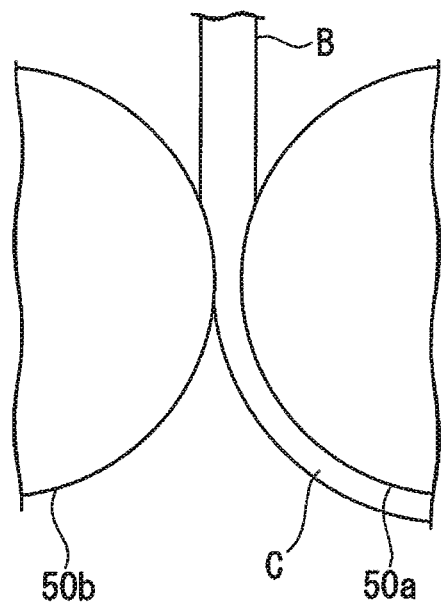
FIG. 2 is a view showing a state in which a sheet-shaped crystalline resin is being press-rolled.

Step 5:

As is shown in FIG. 2, the cooled sheet-shaped crystalline resin B is press-rolled between the pair of pinch rolls 50a and 50b.

Step 6:

The press-rolled sheet-shaped crystalline resin C is wound around approximately $\frac{1}{3}^{rd}$ of the circumference of the pinch roll 50a.

Step 7:

The press-rolled sheet-shaped crystalline resin C is peeled off the pinch roll 50a, and transported to the guide roll 60. Its direction of transport is then bent by the guide roll 60, and it is transported to the wind-on roll 70.

Step 8:

The sheet-shaped crystalline resin D is then wound onto the wind-on roll 70 so that a crystalline resin sheet is obtained.

In the above described manufacturing process, the thickness of the sheet-shaped crystalline resin B which is supplied to the pinch rolls 50a and 50b is adjusted so as to be between 1.3 and 8 times the size of the gap between the two pinch rollers 50a and 50b, and preferably between 1.3 and 5.0 times the size of this gap, and more preferably between 1.4 and 3.5 times the size of this gap.

If the thickness of the sheet-shaped crystalline resin B is less than 1.3 times the size of the gap between the pinch rolls 50a and 50b, then no large strain is generated during the pressing rolling so that it is not possible to orient the molecular chains of the crystalline resin. If the thickness of the sheet-shaped crystalline resin B is more than 8.0 times the size of the gap between the pinch rolls 50a and 50b, then it becomes difficult to make all of the supplied sheet-shaped crystalline resin B pass between the pinch rolls 50a and 50b so that it is not possible to press-roll the sheet-shaped crystalline resin B.

In order to adjust the thickness of the sheet-shaped crystalline resin B, it is possible to appropriately adjust the lip opening of the slit die 30, the quantity of crystalline resin supplied by the gear pump 20, and the gap between the pinch rolls 50a and 50b and the like.

In the above described manufacturing process, the temperature of the sheet-shaped crystalline resin B during the press-rolling is adjusted to not less than the crystallization temperature and not more than the melting point. Preferably, the temperature of the sheet-shaped crystalline resin B is adjusted to not less than 'the crystallization temperature+5° C.' and not more than 'the melting point–5° C.', and more preferably to not less than 'the crystallization temperature+10° C.' and not more than 'the melting point–10° C.' The crystalline resin B under these temperature conditions is in a super-cooled state.

If the temperature of the sheet-shaped crystalline resin B during the press-rolling is adjusted to less than the aforementioned lower limit value, then the molding of the sheet becomes difficult. If the temperature is adjusted to more than the aforementioned upper limit value, then it becomes difficult to orient the molecular chains.

In order to adjust temperature of the sheet-shaped crystalline resin B during the press-rolling, the temperature of the cooling of the sheet-shaped crystalline resin A which is in a melted state by the cooling apparatus 40 may be suitably adjusted.

It is preferable for the resin temperature T of the sheet-shaped crystalline resin B during the press-rolling to be adjusted such that the values of the parameter X determined in the following Formula (2) is within a range of 0.05 to 0.90. The upper limit of X is preferably 0.70, and 0.50 is particularly preferable. Here, the T in Formula (2) is the temperature of the crystalline resin when it is being press-rolled by the pinch rolls 50*a* and 50*b*, Tc is the crystallization temperature of the crystalline resin measured by DSC, and Tm is the melting point of the crystalline resin measured by DSC. If the value of X is 0.05 or more, then it is difficult for the oriented melt to become loosened and a satisfactory nucleation rate can be obtained. Namely, it is possible to more easily obtain a sheet having excellent transparency and rigidity. In contrast, when the value of X is 0.90 or less, the stability when the sheet is being molded is improved.

$$X=(Tm-T)/(Tm-Tc).\quad\text{Formula (2)}$$

In the above described manufacturing process, the roll speed of the wind-on roll 70 is adjusted such that a parameter Z (referred to below simply as Z) which is expressed by the following Formula (1) is 0.09 or less.

$$Z=[(\text{radius [mm] of pinch rolls}\times\text{thickness [mm] of film or sheet after press-rolling})^{1/2}]/\text{roll speed [m/min]}\quad\text{Formula (1)}$$

If the roll speed is adjusted such that Z exceeds 0.09, then a crystalline resin sheet cannot be obtained.

In consideration of manufacturing practicalities, it is preferable for the roll speed of the wind-on roll 70 to be adjusted such that the Z expressed by Formula (1) is 0.017 or more.

In the above described manufacturing process, gas is blown by the twist prevention device 80 towards the portion of the press-rolled sheet-shaped crystalline resin C that has separated from the pinch roll 50*a*. As a result, the sheet-shaped crystalline resin C is prevented from becoming twisted around the pinch roll 50*a*.

The blow-rate of the gas is preferably between 50 and 200 m³/minute. If this blow-rate is 50 m³/minute or more, then the sheet-shaped crystalline resin C can be reliably peeled off. If this blow-rate is 200 m³/minute or less, then any damage to the sheet-shaped crystalline resin C caused by excessive gas being blown onto it can be prevented.

In the above described manufacturing process, it is preferable for the thickness of the sheet-shaped crystalline resin B that is supplied to the pinch rolls 50*a* and 50*b* to be appropriately set. The following methods may be used for the method of measuring the thickness of the sheet-shaped crystalline resin B. For example, laser light may be irradiated onto the crystalline resin B and the light that passes though it then photographed by a CMOS camera, and the thickness then measured from the resulting image. Alternatively, the thickness may be measured using a long distance microscope (for example, the K2 made by Infinity Photo-Optical Ltd., or the like), or measured using a CCD laser displacement sensor (for example, the LK-G series made by Keyence Ltd., or the like).

Examples of crystalline resins to which the above described manufacturing process may be applied include polyalkylenes, polyamides, polyethers, liquid crystal polymers, and the like. Specific examples include polyolefins such as polyethylene, isotactic polypropylene, syndiotactic polypropylene, polybutene-1, and poly 4 methyl pentene and the like, or copolymers of crystalline ethylene and polypropylene, polyamides such as nylon 6, nylon 66, and nylon 12, polyesters such as polybutylene terephthalate and polyethylene terephthalate, fluorine resins such as syndiotactic polystyrene, isotactic polystyrene, polyphenylene sulfide, polyether ether ketone, aromatic polyamides, aromatic polyesters, polytetrafluoroethylene, and polyvinylidene fluorides and the like, aliphatic polyesters such as polyethylene succinate and polybutylene succinate, polylactic acid, polyvinyl alcohol, polyacetal, and polyether nitrile, and the like. However, crystalline resins to which the above described manufacturing process can be applied are not limited to these resins.

These crystalline polymers may be used either singly, or in combinations of the same type provided that the molecular weights thereof are different, or in combinations with amorphous polymers. If combinations of the same or mutually different types of crystalline resins are used, then the molding is conducted such that the relationships in the above described Formula (2) for the respective crystalline resins are established.

If isotactic polypropylene is used, then it is preferable for one that has a higher degree of rigidity to be used. Specifically, the isotactic fraction mmmm of the isotactic polypropylene used is preferably 95% or more, and more preferably 97% or more.

In the above described manufacturing process, because a sheet-shaped crystalline resin in a melted state is press-rolled and drawn between a pair of pinch rollers under specific conditions, it is possible to impart a large strain to the molecular chains of the crystalline resins during the press-rolling. Because the molecular chains are able to be aligned with a high degree of orientation as a result of this large strain, the degree of crystallization in the obtained resin sheet is also high. Namely, the obtained crystalline resin sheet has superior mechanical properties, heat resistance, and transparency.

Furthermore, according to this manufacturing process, it is possible to obtain crystalline resin sheets both in large quantities and continuously. Namely, this manufacturing process is also useful on an industrial scale.

The thickness L of the obtained crystalline resin sheet is preferably between 10 μm and 3 mm, and more preferably between 20 and 300 μm. A crystalline resin sheet having a thickness L of 10 μm or more is easy to mold. If the thickness L is not more than 3 mm, a crystalline resin sheet in which the molecular chains of the crystalline resin are oriented can be easily manufactured.

If practical applications of the crystalline resin sheet thus obtained are considered, then it is preferable for the width of the sheet to be between 0.3 and 2.0 m.

The crystalline resin does not need to be formed solely from crystalline resin and may also contain non-crystalline (i.e., amorphous) resin.

It is particularly preferable for the crystalline resin sheet to not contain nucleating agents and the like which are impurities. Because homogeneous nucleation takes place in a crystalline resin sheet, such sheets have superior mechanical properties even if they do not contain a nucleating agent. Because nucleating agents are far more expensive than crystalline resins, it is possible to avoid conspicuous increases in costs by not using a nucleating agent. Note that the term 'nucleating agent' used here refers to a substance which fauns the nucleus of the crystal formation, and is a generic term for substances that are added in order to increase the degree of crystallinity.

A storage modulus E' of the crystalline resin sheet is preferably 2.5 GPa or more, and more preferably 3.0 GPa or more.

E' is determined using a Vibron (Rheovibron DDV-II-EA) manufactured by Toyo Baldwin as the measuring instrument, and using a measurement test piece having a length of 30 mm and a width of 2 mm (with the lengthwise direction being the sheet wind-on direction). The storage modulus E' was measured at a frequency of 110 Hz, a phase amplitude of 0.025 mm, and a measurement temperature of 25° C.

If the crystalline resin is polypropylene, then the heat resistant temperature is preferably 135° C. or more, more preferably 145° C. or more, and still more preferably 150° C. or more.

The heat resistant temperature is determined using a Vibron (Rheovibron DDV-II-EA) manufactured by Toyo Baldwin as the measuring instrument, and using a measurement test piece having a length of 30 mm and a width of 2 mm (with the lengthwise direction being the wind-on direction of the sheet). Under conditions of a frequency of 110 Hz, and a phase amplitude of 0.025 mm, tensile force of 5 gf was applied to the test piece at the same time as the measurement temperature was raised from 25° C. at a rate of 2° C./min, and the elongation percentage of the polypropylene was measured. The temperature when this elongation percentage reached 1% was taken as the heat resistant temperature.

Here, the elongation percentage is the [(length of test piece during measurement)−(length of test piece prior to heating)]/ (length prior to heating)×100(%).

Crystalline resin sheets obtained via the above described manufacturing process can be used for internal and external packaging materials for means of transport such as automobiles, airplanes, rockets, trains, ships, motorbikes, and bicycles, as well as for parts of machine tools and machine components.

Crystalline resin sheets can also be used for speakers and microphone diaphragms by utilizing their high rigidity and light weight.

Crystalline resin sheets can also be used as a substitute for PC for CDs and DVDs by utilizing their transparency.

Crystalline resin sheets can also be used for masks for liquid crystal and plasma displays and the like by utilizing their transparency.

Crystalline resin sheets can also be used for medical supplies and equipment 25 such as disposable syringes, intravenous drip implements, chemical containers and the like by utilizing their transparency.

Crystalline resin sheets can also be used as a substitute for glass for various types of bottles, glass, small household water tanks, and large commercial water tanks.

Crystalline resin sheets can also be used for contact lenses, spectacle lenses, and various types of optical lenses by utilizing their transparency.

Crystalline resin sheets can also be used for glass for buildings and houses by utilizing their transparency.

Crystalline resin sheets can also be used for a broad range of sporting goods such as ski boots, skis, snowboards, rackets, various nets, tents, and rucksacks and the like by utilizing their rigidity, high fracture toughness, and light weight.

Crystalline resin sheets can also be used for handicraft supplies and decorating supplies such as needles, scissors, sewing machines, and the like by utilizing their rigidity, high fracture toughness, and light weight.

Crystalline resin sheets can also be used for commercial supplies such as show window and display components.

Crystalline resin sheets can also be used for equipment and facilities for parks, amusement parks, and theme parks such as swings, see-saws, roller coasters and the like.

Furthermore, crystalline resin sheets can also be used for structural material and housing materials of electrical, electronic, and information instruments, or components of high-precision instruments such as clocks, for stationery goods such as files, folder, writing cases, writing tools, and scissors, for cooking utensils such as kitchen knives and bowls, for packaging materials for food, sweets, cigarettes and the like, for food containers, dishes, chopsticks, and toothpicks, for furniture such as household furniture and office furniture, for construction materials, internal finishing materials, and external finishing materials of buildings and houses, for materials used on roads and bridges, for materials used to make toys, for ultra-high strength fibers and threads, for fishing equipment for the fishing industry, fishing nets, and hobby fishing gear, for agricultural implements and industrial goods, for shopping bags and rubbish bags, for various types of tubing, for garden items, and for transport containers, pallets, and boxes, and the like.

The range of applications of the crystalline resin sheet of the present invention is not limited to the above described applications.

Note that the present invention is not limited to the above described embodiment. Moreover, the process used to cool the crystalline resin of the present invention to a super-cooled temperature (i.e., a temperature which is not less than the crystallization temperature yet not more than the melting point) is not limited to the process shown in FIG. 1.

Moreover, it is also possible for the solidified resin sheet obtained via the process described in Patent document 5 to firstly be continuously heated to its melting point or more using a heating tunnel or the like, and to then be cooled to the crystallization temperature or less, and for the resulting cooled material to be press-rolled between a pair of pinch rollers under the conditions described in Formula (1). A crystalline resin sheet having the same type of properties as in the above described embodiment can also be obtained via this process as well.

In the above described embodiment, a process for manufacturing a crystalline resin sheet has been described. However, the same type of manufacturing apparatus and manufacturing process can be also be applied to the manufacturing of a crystalline resin film as well. Note that uses of crystalline resin films are similar to those of crystalline resin sheets.

EXAMPLES

The melting points and crystallization temperatures of the crystalline resins used in the following examples were measured under the following conditions.

Measurement apparatus: Diamond DSC manufactured by PerkinElmer.

Mass of test sample: approximately 5 mg

Measurement temperature pattern: (1) held at 230° C. for 5 minutes, (2) cooled at a rate of 10° C. and crystallization temperature was measured, (3) held at 30° C. for 10 minutes, (4) heated at a rate of 10° C. and melting point was measured, (5) apex point of peak was measured.

The isotactic fraction mmmm in pentad units of the methyl base in the molecular chain, which is an index of the stereoregularity of the polypropylene copolymer, was determined from measurements by a JNM-GSX 400 (having a $^{13}C$ nuclear resonant frequency of 100 MHz) manufactured by NMR (JEOL Ltd).

The measurement conditions for the NMR were as follows.

Measurement mode: Proton decoupling technique, Pulse width: 8.0 usec, Pulse repeat time: 3.0 usec, Number of multiplications: 20,000, Solvent: solvent mixture containing 1,2,4-trichlorobenzene (75% by vol.)/deuterated benzene (25% by vol.), Internal standard: Hexamethyldisiloxane: test sample concentration: 300 mg/3.0 ml of solvent, Measurement temperature: 120° C.

Note that the respective signals were assigned based on "Macromolecules" by A. Zambelli et al, 13, 267, pub. 1980.

Example 1

A crystalline resin sheet was obtained using the manufacturing apparatus 1 shown in FIG. 1. However, the guide roll 60 and the wind-on roll 70 were not used. A single screw extruder (manufactured by Create Plastics Ltd.) in which the aperture diameter of the cylinder 11 was 40 mm, the screw 12 was a fully-flighted type, and the LID-30 was used as the extruder 10 in the manufacturing apparatus 1. A slit die having a width of 10 mm and a lip opening of 0.5 mm was used for the slit die 30. Pinch rolls having a diameter of 200 mm were used for the pinch rolls 50a and 50b.

SunAllomer PM802A (homopolypropylene, MFR: 20 g/10 mins, Melting point: 162.4° C., Crystallization temperature: 116.0° C., stereoregularity: 98.3%) manufactured by SunAllomer Ltd. was used for the crystalline resin.

The specific manufacturing process was performed in sequence in accordance with the following Steps 1 through 6.

[Step 1]

The cylinder 11 was heated to 200° C., the gear pump 20 and the slit die 30 were heated to 190° C., the motor 13 was driven so that the screw 12 was rotated, and thereafter polypropylene pellets were supplied from the hopper 14. As a consequence, the polypropylene was supplied to the gear pump 20 as it was being melted.

[Step 2]

The melted polypropylene was supplied at a discharge rate of 330 g/hour through the gear pump 20.

[Step 3]

The polypropylene was discharged from the slit die 30 so that a sheet-shaped crystalline resin A in a melted state was formed.

[Step 3]

The pinch rolls 50a and 50b were adjusted to 120° C., and the gap between the pinch rolls 50a and 50b when they were sandwiching the sheet was adjusted to 100 um. [Step 4]

The gap between the pinch rolls 50a and 50b was first widened to 50 mm, then the sheet-shaped crystalline resin B in a melted state (having a length of approximately 60 cm) was wrapped around the circumferential surface of the pinch roll 50a, and the resin temperature was measured. After 5 seconds had elapsed after the sheet-shaped crystalline resin B in a melted state was wrapped around the circumferential surface of the pinch roll 50a, the roll speed was set to 50 m/min.

[Step 5]

The pinch rolls 50a and 50b were closed and the gap between the pinch rolls 50a and 50b was set to 100 gm. Thereafter, the sheet-shaped crystalline resin B in a melted state (having a thickness of 500 um) was press-rolled. In the present example, the surface temperature of the pinch rolls 50a and 50b was substantially the same as the resin temperature of the sheet-shaped crystalline resin B during the press-rolling.

[Step 6]

The gap between the pinch rolls 50a and 50b was widened to 50 mm, and the crystalline resin sheet C which was obtained after the press-rolling was peeled away from the surface of the pinch roll 50a. The thickness of the crystalline resin sheet C thus obtained was 155 pm. Note that the thickness of the sheet was measured in accordance with ISO 4591.

The heat resistant temperature and storage modulus E of the obtained crystalline resin sheet were measured in the following manner. The measurement results are shown in Table 1.

[Heat Resistant Temperature]

A Vibron (Rheovibron DDV-II-EA) manufactured by Toyo Baldwin was used as the measuring instrument, and a piece having a length of 30 mm, a width of 2 mm, and a thickness of 0.3 mm (with the lengthwise direction thereof being the wind-on direction of the sheet) was used as the measurement test piece. Under conditions of a frequency of 110 Hz, and a phase amplitude of 0.025 mm, tensile force of 5 gf was applied to the test piece at the same time as the measurement temperature was raised from 23° C. at a rate of 2° C./min, and the elongation percentage of the test piece was measured. The temperature when this elongation percentage reached 1% was taken as the heat resistant temperature.

[Storage Modulus E']

A Vibron (Rheovibron DDV-II-EA) manufactured by Toyo Baldwin was used as the measuring instrument, and a piece having a length of 30 mm, a width of 2 mm, and a thickness of 0.3 mm (with the lengthwise direction thereof being the wind-on direction of the sheet, and with the piece being cut away from the center in the widthwise direction of the sheet) was used as the measurement test piece. Under conditions of a frequency of 110 Hz, a phase amplitude of 0.025 mm, and a temperature increase rate of 2° C./min, the storage modulus E' was measured at 25° C., 120° C., and 180° C.

Examples 2-4

Other than altering the manufacturing conditions in the manner shown in Table 1, sheets were obtained in the same way as in Example 1. The heat resistant temperature and storage modulus of the sheets that were obtained in this manner were measured in the same way as in Example 1. The measurement results are shown in Table 1.

Comparative Example 1

Other than altering the roll speed to 16 m/min, the manufacturing conditions were set to the same as those in Example 1. In this case, at the same time as the pinch rolls 50a and 50b were closed, the crystalline resin was blown away by the centrifugal force of the roll rotation so that a solidified sheet was not obtained.

Comparative Example 2

Other than altering the surface temperature to 165° C., the manufacturing conditions were set to the same as those in Example 1. In this case, at the same time as the pinch rolls 50a and 50b were closed, the crystalline resin was blown away by the centrifugal force of the roll rotation so that a solidified sheet was not obtained.

Comparative Example 3

Other than altering the roll surface temperature to 110° C., the manufacturing conditions were set to the same as those in Example 1. In this case, solidification of the sheet-shaped crystalline resin B which was in a melted state began as soon as it was wound around the pinch roll 50a so that crystalline resin was not obtained.

Comparative Example 4

Using a cast film molding apparatus provided with a single screw extruder having a cylinder diameter of 25 mm and a T-die having a width of 300 mm, the same type of polypropylene as in Example 1 was extrusion molded at 220° C., and normal cast film molding using a casting roll and an air knife was performed. At this time the temperature of the casting roll was 30° C.

The thickness of the sheet thus obtained was 356 um. The heat resistant temperature and storage modulus of the sheet that was obtained in this manner were measured in the same way as in Example 1. The measurement results are shown in Table 1.

Comparative Examples 5 and 6

In cases such as in Comparative example 1 in which the roll temperature was low and Z was large, there was no solidification during press-rolling. Because of this, molding was performed continuously while the roll surface temperature was lowered and the melted resin was cooled.

Specifically, the following Steps 1 through 4 were performed in the following sequence.

[Step 1]

Using the manufacturing apparatus 1 shown in FIG. 1 in the same way as in Example 1, the same type of polypropylene as in Example 1 was discharged through the slit die 30 so as to form the sheet-shaped crystalline resin A which was in a melted state.

[Step 2]

The sheet-shaped crystalline resin A in a melted state was cooled by cooling gas (air which was passed through liquid nitrogen) inside the chamber 41 of the cooling apparatus 40, and the cooled sheet-shaped crystalline resin B was then press-rolled between the pair of pinch rolls 50a and 50b (which had a surface temperature of 40° C.). When the resin temperature of the sheet-shaped crystalline resin B was measured by an infrared temperature sensor prior to it being sandwiched between the pinch rolls 50a and 50b, it was found to be 150° C.

[Step 3]

The sheet-shaped crystalline resin C which had been press-rolled was peeled away from the pinch roll 50a, and was transported to the guide roll 60. Its direction of transport was then bent by the guide roll 60, and it was transported to the wind-on roll 70.

[Step 4]

The sheet-shaped crystalline resin D was then wound onto the wind-on roll 70. The heat resistant temperature and storage modulus of the sheet that was obtained in this manner were measured in the same way as in Example 1. The measurement results are shown in Table 1.

TABLE 1

|  |  |  | Examples | | | | Comparative examples | | | | | |
|---|---|---|---|---|---|---|---|---|---|---|---|---|
|  |  |  | 1 | 2 | 3 | 4 | 1 | 2 | 3 | 4 | 5 | 6 |
| Manufacturing conditions | Resin temperature before rolling | ° C. | 140 | 140 | 160 | 140 | 140 | 170 | 110 | 220 | 150*[1] | 150*[1] |
|  | Roll surface temperature | ° C. | 140 | 140 | 160 | 140 | 140 | 170 | 110 | 30 | 40 | 40 |
|  | Thickness of supplied sheet-shaped crystalline resin | μm | 500 | 500 | 500 | 600 | 500 | 500 | 500 | —*[2] | 500 | 400 |
|  | Pinch roll gap | μm | 100 | 300 | 300 | 400 | 100 | 100 | 200 | —*[3] | 100 | 200 |
|  | Roll speed | m/min | 50 | 66 | 132 | 163 | 16 | 200 | 50 | 5 | 16 | 48 |
|  | Crystalline resin sheet width | mm | 10 | 10 | 10 | 10 | 10 | 10 | 10 | 300 | 10 | 10 |
|  | Crystalline resin sheet thickness | μm | 155 | 315 | 273 | 431 | not moldable | not moldable | not moldable | 356 | 144 | 247 |
|  | Z in Formula (1) |  | 0.079 | 0.085 | 0.040 | 0.040 | 0.198*[5] | 0.016*[5] | 0.089*[5] | — | 0.237 | 0.104 |
|  | X in Formula (2) |  | 0.48 | 0.48 | 0.05 | 0.48 | 0.48 | −0.17 | 1.13 | — | 0.26 | 0.26 |

TABLE 1-continued

|  |  |  | Examples | | | | Comparative examples | | | | | |
| --- | --- | --- | --- | --- | --- | --- | --- | --- | --- | --- | --- | --- |
|  |  |  | 1 | 2 | 3 | 4 | 1 | 2 | 3 | 4 | 5 | 6 |
|  | Thickness of sheet-shaped crystalline resin supplied to pinch rolls/ thickness of obtained sheet |  | 3.2 | 1.6 | 1.6 | 1.4 | 5.0*5 | 5.0*5 | 2.5*5 | 1.1 | 3.5 | 1.6 |
| Proper-ties | Heat resistant temperature | °C. | 203 | 198 | 206 | 194 | — | — | — | 179 | 177 | 165 |
|  | Storage modulus E' (25° C.) | MPa | 4550 | 3870 | 4450 | 3100 | — | — | — | 1600 | 1760 | 1700 |
|  | Storage modulus E' (120° C.) | MPa | 1290 | 1020 | 1350 | 950 | — | — | — | 300 | 559 | 267 |
|  | Storage modulus E' (180° C.) | MPa | 114 | 90 | 46 | 46 | — | — | — | —*4 | —*4 | —*4 |

*1 Temperature before cooling between pinch rolls
*2 Not measured
*3 No pinch rolls, therefore no gap
*4 Broken, therefore not measurable
*5 Estimated value when gap between pinch rolls is taken as thickness As is described above, the manufacturing process of Examples 1 through 4 was adjusted to the following manufacturing conditions.

[1] The thickness of the sheet-shaped crystalline resin B which was supplied to the 10 pinch rolls 50a and 50b was between 1.3 and 8.0 times the thickness of the sheet after it was press-rolled.

[2] The temperature of the sheet-shaped crystalline sheet during press-rolling was set to not less than the crystallization temperature and not more than the melting point.

[3] The roll speed was adjusted to the range given in Formula (1).

As a result, in the manufacturing process of Examples 1 through 4, the heat resistant temperature and storage modulus E' of the obtained sheets were very high.

Specifically, at 25° C., the values of the storage modulus of the sheets obtained using the manufacturing processes of Examples 1 through 4 were 2 to 3 times the value of the sheet obtained using the normal manufacturing process shown in Comparative example 4. Moreover, at 120° C., the storage modulus of each of the sheets obtained using the normal manufacturing processes shown in Comparative examples 4 through 6 was reduced to such an extent that, depending on the application, these sheets effectively had no practical usefulness. However, each of the sheets obtained using the manufacturing processes of Examples 1 through 4 exhibited a satisfactory storage modulus.

Furthermore, because the storage modulus is measured while stress is being applied, typically, measurement becomes difficult at temperatures exceeding melting point. However, the sheets obtained in Examples 1 through 4 were able to maintain their shape even at 180° C., and they exhibited a high modulus of elasticity. An elongation rate in excess of 1% was not exhibited until the temperature was approximately 200° C., which was beyond the melting point, so that these sheets were determined to have a high heat resistance.

In contrast to this, in Comparative examples 1 through 4 the following results were obtained.

Comparative Example 1

Because the roll speed was slow, the value of Z was high. Consequently, the crystalline resin did not solidify and a sheet could not be obtained. When the value of Z was estimated from the gap between the pinch rolls 50a and 50b, it was estimated to be 0.198, and it can be assumed that Z was not 0.09 or less.

Comparative Example 2

As a result of the roll surface temperature being too high, the temperature of the sheet-shaped crystalline resin during press-rolling exceeded the melting point thereof. As a consequence, the crystalline resin did not solidify even when the roll speed was increased, and it was not possible to obtain a sheet.

Comparative Example 3

As a result of the roll surface temperature being too low, the temperature of the sheet-shaped crystalline resin B prior to press-rolling was less than the crystallization temperature. Consequently, the crystalline resin B solidified immediately after it was wound onto the circumferential surface of the pinch roll 50a, and it was not obtainable in sheet form.

Comparative Example 4

The manufacturing process of Comparative example 4 is a typical sheet molding process in which melted crystalline resin is cooled and solidified using a roll. The heat resistant temperature and storage modulus of the sheet obtained by using this manufacturing process were both low.

Comparative Examples 5 and 6

The sheets were press-rolled by the pinch rolls 50a and 50b, however, the roll speed was not sufficiently fast. As a result, the value of Z was too large and so that the heat resistant temperature and storage modulus of the obtained sheets were both low.

INDUSTRIAL APPLICABILITY

According to the process and apparatus for manufacturing a crystalline resin film or sheet of the present invention, it is possible to orient molecular chains of crystalline resins both in large quantities and with continuously superior orientation. Namely, it is possible to manufacture on an industrial scale a crystalline resin film or sheet having superior mechanical properties, heat resistance, and transparency.

DESCRIPTION OF THE REFERENCE NUMERALS

1 Manufacturing apparatus
10 Extruder
11 Cylinder
12 Screw
13 Motor
14 Hopper
20 Gear pump
21 Housing
30 Slit die
40 Cooling apparatus
41 Chamber
42 Cooling gas supply tube
43 Discharge pipe
50a, 50b Pinch rolls
60 Guide roll
70 Wind-on roll
80 Twist prevention device

The invention claimed is:

1. A process for manufacturing a crystalline resin film or sheet in which film-shaped or sheet-shaped crystalline resin which is in a melted state is cooled and press-rolled between a pair of pinch rolls, the process comprising:
   a first step of cooling the film shaped or the sheet-shaped crystalline resin which is in the melted state to a temperature of not less than the crystallization temperature and not more than the melting point to make the film shaped or the sheet-shaped crystalline resin in a super-cooled state, and
   a second step of press-rolling the film shaped or the sheet-shaped crystalline resin which is in the super-cooled state between the pair of pinch rolls to form the crystalline resin film or sheet,
   wherein in the second step, the thickness of the film-shaped or sheet-shaped crystalline resin, which is in the super-cooled state before it is press-rolled, is adjusted to between 1.3 and 8.0 times the thickness of the crystalline resin film or sheet after it has been press-rolled, and
   the roll speed of the pair of pinch rolls is adjusted such that Z which is expressed by the following Formula (1) is 0.09 or less, $Z=[(\text{radius [mm] of pinch rolls} \times \text{thickness [mm] of film or sheet after press-rolling})^{1/2}]/\text{roll speed [m/min]}$.     Formula (1)

2. The process for manufacturing a crystalline resin film or sheet according to claim 1, wherein the film-shaped or sheet-shaped crystalline resin which is in a melted state is obtained by discharging melted crystalline resin from a die which has a slit-shaped aperture portion.

3. The process for manufacturing a crystalline resin film or sheet according to claim 1, wherein, after being press-rolled, the film-shaped or sheet-shaped crystalline resin is peeled away from the pinch rolls, and gas is blown onto the press-rolled portions of the film-shaped or sheet-shaped crystalline resin that have been peeled away from the pinch rolls.

4. The process for manufacturing a crystalline resin film or sheet according to claim 1, wherein mold release treatment has been performed in advance on the circumferential surface of each pinch roll.

5. The process for manufacturing a crystalline resin film or sheet according to claim 1, wherein, when T is the temperature of the film-shaped or sheet-shaped crystalline resin during press-rolling, and when Tc is the crystallization temperature, and when $T_m$ is the melting point, then the temperature T of the crystalline resin is adjusted such that the value of X which is determined by the following Formula (2) is within a range of 0.05 to 0.90, $X=(Tm-T)/(Tm-Tc)$.     Formula (2)

* * * * *